(12) United States Patent
Clifford et al.

(10) Patent No.: US 7,231,450 B1
(45) Date of Patent: Jun. 12, 2007

(54) METHOD FOR PROVIDING RELIABLE SOFT GOODS LICENSE AUTHORIZATION

(75) Inventors: Andrew D. Clifford, Marlboro, NJ (US); Arunabha Guha, Lakewood, NJ (US); Mark W. Mueller, Holmdel, NJ (US); Lawrence E. Murphy, Little Silver, NJ (US); Russell P. Sharples, East Windsor, NJ (US)

(73) Assignee: AT&T Corporation, Bedminster, NJ (US)

( * ) Notice: Subject to any disclaimer, the term of this patent is extended or adjusted under 35 U.S.C. 154(b) by 424 days.

(21) Appl. No.: 10/131,552

(22) Filed: Apr. 24, 2002

(51) Int. Cl.
*G06F 15/16* (2006.01)
(52) U.S. Cl. ............... 709/229; 709/202; 709/225
(58) Field of Classification Search ............ 709/229
See application file for complete search history.

(56) References Cited

U.S. PATENT DOCUMENTS

| | | | |
|---|---|---|---|
| 5,636,276 A | 6/1997 | Brugger | |
| 5,708,780 A | 1/1998 | Levergood et al. | |
| 5,956,482 A | 9/1999 | Agraharam et al. | |
| 6,189,146 B1 * | 2/2001 | Misra et al. | 717/177 |
| 6,732,179 B1 * | 5/2004 | Brown et al. | 709/229 |
| 6,763,370 B1 * | 7/2004 | Schmeidler et al. | 709/203 |
| 2001/0051996 A1 * | 12/2001 | Cooper et al. | 709/217 |
| 2002/0174354 A1 * | 11/2002 | Bel et al. | 713/193 |
| 2003/0126086 A1 * | 7/2003 | Safadi | 705/51 |
| 2004/0044779 A1 * | 3/2004 | Lambert | 709/229 |

\* cited by examiner

*Primary Examiner*—Rupal Dharia
*Assistant Examiner*—Nicholas R. Taylor
(74) *Attorney, Agent, or Firm*—Buskop Law Group PC; Wendy K. Buskop

(57) ABSTRACT

The present invention is a method and system for providing authorization to a customer to access content on a network. A network access provider providing network access to the customer provides verification of the identity of the customer to a content provider. The content provider then determines whether that customer is authorized to access the content and, if so, provides the customer with such access. The invention provides content access based on the identity of the customer, rather than on the identity of a device the customer uses to access the content. In that way, the customer is not restricted to accessing the content through only an authorized device.

26 Claims, 2 Drawing Sheets

METHOD FOR PROVIDING RELIABLE SOFT GOODS LICENSE AUTHORIZATION

FIELD OF THE INVENTION

The present invention relates generally to the licensing and distribution of media content such as audio and video over a network; and, more particularly, to a method for authorizing a user to access such content without relying on the identification of a particular accessing device to verify authorization.

BACKGROUND OF THE INVENTION

Content providers charge users for access to content. In many cases, the user pays a one-time fee to become authorized for unlimited access to the content. This is the case, for example, where physical media containing the content is purchased, or where an open-format content file is downloaded from the content provider. The authorized user can then access the content using any compatible device as often as the authorized user desires. For example, a music company (content provider) may sell a music CD to a user who can then play it as often as he likes in any of a number of home, car, or portable CD players.

Content providers wish to prevent unauthorized users from accessing and duplicating content that has been licensed to an authorized user. In the past, the physical format of the content made it impractical to copy and so possession of the content was tantamount to authorization. For example, possession of music recording in the form of an analog magnetic tape or LP did not enable the possessor to create unlimited copies of quality equal to the original. In contrast, digital recordings are easy to copy and so content providers have been reluctant to provide digital content without a means of preventing its access by unauthorized users. Nearly all current systems for preventing unauthorized access to digital content do so by encrypting the content so that it can be accessed only on a specific device owned by the authorized user and identified at the time the content is purchased. The content can never be used with a different device. Such content is called "device-authorized content" because the content is now associated not with a user, but only with a specific device. That system has a very significant problem in that it greatly limits the authorized user's access to the content by forcing the user to use a single access device even though the user may have multiple devices that could otherwise access the content. For example, a digital music file purchased with authorized access by a single digital music player cannot be played on other players owned by the purchaser. Therefore, if the authorized device is lost, broken, or replaced, the content becomes inaccessible despite the fact that the user purchased unlimited access.

One solution to this problem is for the user to authorize each of the devices owned by the user for the specific content. In that case, however, if the user owns three devices, the user must carry out three transactions to get three instances of the content to work on each of the three devices. When the user acquires a new device, the user must procure new instances of all the user's content (possibly thousands of items) for the new device. Therefore, current systems for preventing unauthorized access to licensed digital content have the undesired effect of actually authorizing only a device, not a user, thereby restricting the authorized user's access to the content and creating unwieldy management challenges.

It is therefore desirable to provide network access to content that is user-authorized, rather than device authorized. A user purchasing access to content under such a system would have access to that content using any compatible device.

SUMMARY OF THE INVENTION

The present invention addresses those needs by using a network access provider (NAP) as a trusted authority for identifying the user associated with a network enabled device. A NAP, as that term is used herein, provides a user with access to a network. One example of a NAP is an Internet service provider (ISP) that provides users with access to the Internet. Users who purchase network access from the NAP are inventoried by the NAP in a database along with specific reliable data about their network access. A network enabled device for accessing licensed content requests authorization through an access gateway to access the content. By associating the access gateway data that accompanies the request from the network-enabled device with account data about the user who established the network access, the NAP can reliably associate the device with the user. If the user is authorized by the content provider to access the content, then the NAP can, in turn, pass that authorization back to the device behind the gateway that originated the request. The authorization takes place without regard to the identity of the specific device. Instead, authorization is based on the fact that the device is using a network access gateway associated with an authorized user.

One embodiment of the invention is a method for authorizing a customer to access content on a network. The customer is connected through a gateway to an access provider providing access to the network. A request for authorization to access content is first received from the customer through the gateway. The customer is then identified using an identification of the gateway. The request for authorization and the customer identification are forwarded to a content provider. Authorization for the customer to access the content is received from the content provider and that authorization is forwarded to the customer.

In one variation of the method, the request for authorization from the customer contains data associated with the content. In that case, the step of forwarding the request for authorization to the content provider includes forwarding the data associated with the content.

In another variation, the request for authorization from the customer contains data associated with a device to be used to access the content. In that case, the step of forwarding the request for authorization to the content provider may include forwarding the data associated with the device. Further, the authorization received from the content provider may be device-specific.

The method may include the step of retrieving customer data from a database using data associated with the gateway. The content may be selected from a group consisting of a digital music file, a digital video file, a subscription-based software application, a network game, a digital text file and a digital still image.

The authorization may be a decryption key. It may be contingent on a criteria selected from the group consisting of the content access device type, the identification of the gateway, the time of day, the license term, gateway physical and logical characteristics and gateway physical location.

In another embodiment of the invention, a method is provided for authorizing a customer to access content on a network wherein the customer is connected through a gateway to an access provider for the network. A request for authorization to access content is received from the customer through the gateway. The request includes an identification of the gateway and an identification of a device for accessing the content. An identification of the customer is retrieved from a database based on the identification of the gateway and the identification of the device. The customer identification and the device identification are forwarded to a content provider. A decryption key for decrypting the content is then received from the content provider, and the key is forwarded to the customer.

In that method, the gateway between the customer and the network access provider may be established using a password, biometric data, possession of an identity card or possession of a credit card. Alternatively, the gateway between the customer and the network access provider may be established based on the identity of a network connection device.

Another embodiment of the invention is a method for authorizing a customer to access content, wherein the customer and a content provider are connected through a network access provider. The content provider receives from the network access provider an identification of the customer determined by the network access provider using an identification of a gateway connecting the customer and the network access provider. From the identification of the customer, the content provider determines that the customer is authorized to access the content. The content provider then sends to the network access provider an authorization for the customer to access the content.

These and other advantages of the invention will be apparent to those of ordinary skill in the art by reference to the following detailed description and the accompanying drawings.

DETAILED DESCRIPTION

Figure 1:
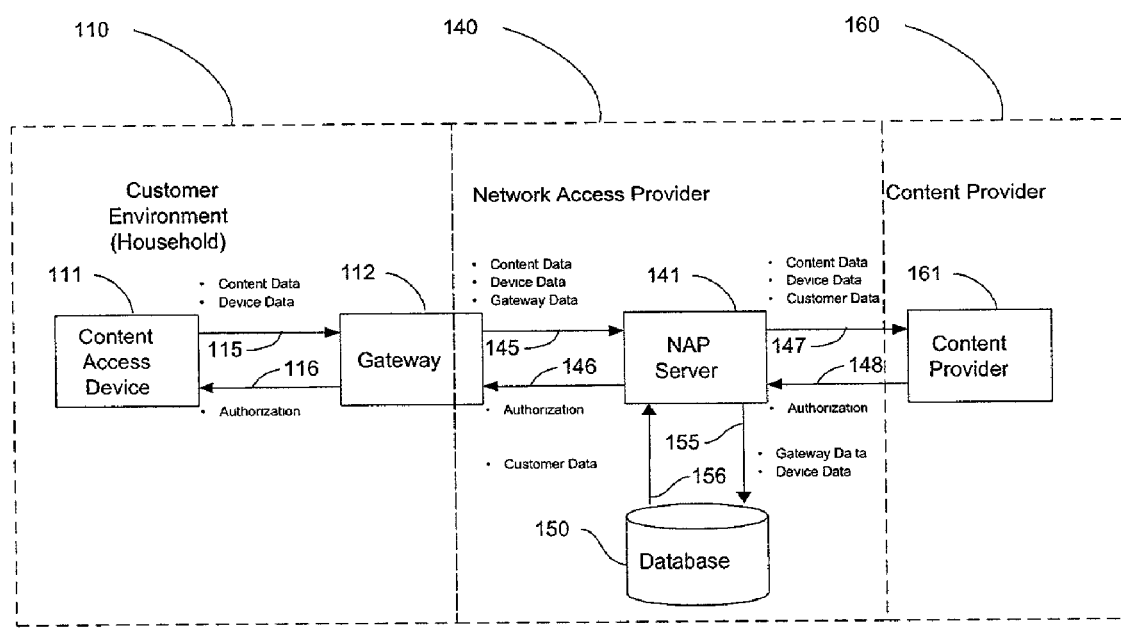
FIG. 1 is a network diagram illustrating one embodiment of the present invention.

The present invention is a method that permits digital content providers to ensure that only authorized users access licensed content. Under the method, digital content that is licensed to a particular individual may be accessed only by that individual. That individual, however, is not limited to using a predefined device or set of devices that have been authorized for accessing the content. Instead, the individual may use any device in accessing the content for which the individual is authorized.

The method relies on a NAP to authenticate a user and then act as a trusted authority on behalf of the user. In the case of the Internet, the NAP provides network access by providing static or dynamic user Internet addresses. Static IP addresses are permanently or semi-permanently assigned to an individual machine or account. Dynamic addresses, on the other hand, are assigned to a single machine or account only for the duration of a session or for some other limited time period.

Network addresses have historically been a scarce resource. In part for that reason, a NAP typically assigns its customers dynamic network addresses. In that way, a network address is in use only for the duration of a particular session, and can be reassigned to another customer when a previous user no longer needs it. While useful in conserving IP addresses, such a system makes it difficult or impossible for a content provider, on its own, to reliably identify a particular customer based on the IP address under which that customer is currently connected to the Internet.

In contrast, a NAP keeps detailed and current records correlating customers who are connected to the network with the IP addresses used by those customers. The NAP therefore has the unique ability to reliably identify a customer based on an IP address (or other gateway identifiers) through which that customer is connected to the network.

The method of the present invention utilizes a connection gateway between an access device and a NAP by reliably associating all traffic from a particular gateway with a particular user. The gateway is defined architecturally. It is a point in the connection stream between the customer and the NAP. All devices on the customer side of the gateway are logically dedicated to a particular customer. This is essential because it must be established that any information coming through the gateway is unquestionably associated with the customer. The gateway must furthermore be trusted by the NAP; the gateway is "hardened" such that it would be difficult to trick it in to passing traffic from an adversarial user as if it came from the customer. The gateway must also enforce authentication of the user, allowing only authorized traffic to pass in the direction of the NAP.

The gateway need not be a single device. For example, the combination of a cable modem, CMTS, and SIP (session initiation protocol) proxy can form a gateway where the SIP proxy performs the authentication, the CMTS is the trusted device that performs enforcement, and the cable modem provides the point of physical access.

A gateway may similarly be defined for other network access devices, including wireless devices such as a cell phone or a personal digital assistant (PDA) containing wireless network access technology (e.g., 802-11b, cellular, etc.), and dial-up modems. In each case, the gateway enforces authentication of the user, either through a login process that may include an ID/password exchange or other authentication means known in the art.

Each gateway is uniquely identifiable to the NAP. In a preferred embodiment, a NAP has access to one or more hardware identifiers such as MAC (Media Access Control) addresses associated with devices within the gateway. The NAP can thereby determine an identity of the gateway that distinguishes that gateway from all others.

Once a user has authenticated through a gateway, if a device contacts the NAP through that gateway, the NAP can reliably associate that device with the gateway's authenticated user. The NAP can then contact the content provider with the identity of the licensed content and the user; the content provider can apply its own algorithms to determine if the user is authorized to access the content, and then such authorization can be returned by the NAP to the device. In a preferred embodiment, the encrypted content is in the user's possession or accessible by the user; the content is furthermore in a format compatible with the user's content access device(s). Authorization from the content provider may be in the form of a device-specific decryption key.

In the case where the gateway is a dynamic connection such as a dial-up modem in a modem pool, the gateway is not associated with any particular machine, and is instead established through the login process of the particular NAP through which the connection is made. That process may include the use of a password, biometric data, possession of an identity card or possession of a credit card. Such a gateway is not limited to a particular physical location. In any case, any devices behind the gateway for viewing or playing content are presumed to be under the user's control.

A network 100 in accordance with the invention is shown in FIG. 1. The network may be separated into three general regions: a customer environment such as a household 110, a network access provider 140 and a content provider 160. Those three regions are typically separated geographically. The customer environment 110 and network access provider 140 are connected through a gateway 112. The content provider 160 and network access provider 140 are typically connected through a data network such as the Internet, although those entities may be connected by other means such as a local area network (LAN).

The messages exchanged in the network 100 during a customer authorization are described with reference to the network diagram of FIG. 1. A content access device 111 in the customer environment 110 initially sends a request for authorization to a NAP authorization server 141. The content access device is a network-enabled device capable of "playing" the particular content. For music, the device may be a portable music player or stereo component; for movies it may be a STB or digital video recorder (e.g. TiVo or RePlay box); for software, it could be computer or computing terminal; for written material, it could be a digital book reader or reader application on a computer or PDA.

The device 111 transmits a message 115 to the gateway 112 identifying the desired content to enable the content provider to determine whether the customer is authorized to access the content. The message also identifies the content access device 111 so that a device-specific decryption key may be created by the content provider, if required. Gateway-identifying information is added to the message 115, for use by the NAP in verifying the customer. The combined data 145 is forwarded to the NAP server 141.

The NAP server 141 retrieves customer data 156 from a database 150 accessible to the NAP. The database 150 contains customer identification records such as names, addresses and telephone numbers. The database also contains data correlating each customer with a gateway through which the customer is authorized for network access using the NAP. The NAP uses data 155 including the gateway data and the device data previously received from the gateway 112 to look up the customer data 156 in the database 150. In the course of its business, a NAP typically maintains a database such as database 150 for tracking its business, for authorizing connections and for billing; there is therefore little additional cost associated with using the database 150 for purposes of the present invention.

After the NAP authorization server 141 has determined the identity of the customer by accessing the database 150, the NAP server forwards a message 147 to a content provider server 161. The message 147 is a request to authorize a particular customer to access particular content. The message contains the content data, the device data from the content access device 111, and the customer data determined by the NAP server 141.

The content provider 161 uses an internal algorithm to determine whether the identified customer is authorized to access the identified content. If so, the content provider server 161 returns an authorization 148 to the NAP authorization server 141. In a preferred embodiment, the authorization is in the form of device-specific decryption key, to be used to decrypt content already in the possession of the customer. In that way, any content access device behind the customer gateway may be authorized to access the content. Alternatively, other authorization means, such as an ID/password system, may be used. In another embodiment, the content is streamed in a form that is not encrypted with a device-specific key. The stream passes through the gateway for access by any device behind the gateway.

The NAP authorization server 141 forwards the authorization 146 to the gateway 112, which, in turn, transmits it in a message 116 to the content access device 111. With the decryption key, password or other authorization means, the user is able to access the desired content using the authorized device.

Depending on the encryption methodology and digital rights management policy, a decryption key could be required each time content is accessed, or alternatively, at the expiration of a predetermined time period. In either case, the device would fetch a key each time one was required. When a new device is acquired by a customer, the device requests a key and is authorized in a manner similar to the old device. The process would be transparent to the user. In contrast, in the current process, when a new device is acquired, all previously obtained content is unusable and must be re-obtained, encrypted for the new device. By authorizing based on the identification of the customer, and not on the identification of the device, the method of the present invention allows any device to decrypt a given instance of the content once the device receives the appropriate key from the content provider. The content provider, in turn, generates the appropriate decryption key using information it has about the content encryption and the device data provided by the NAP.

Figure 2:
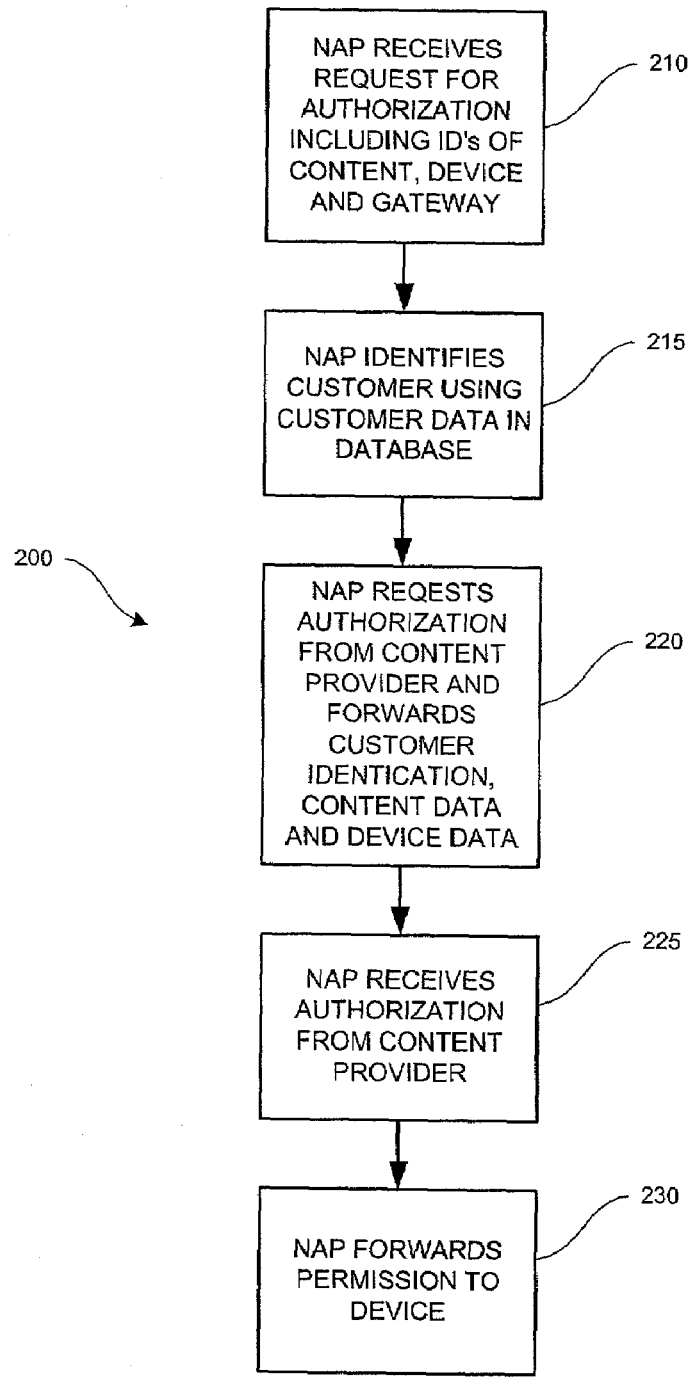
FIG. 2 is a flow chart illustrating one method of accessing content according to the invention.

A method 200 for authorizing a customer to access content on a network is shown in FIG. 2. A network access provider in step 210 receives a request for authorization through the gateway. The request includes an identification of the content that the customer desires to access and an identification of the gateway through which the customer is currently requesting authorization. In the case where the authorization will include a device-specific decryption key, an identification of the device the customer is using to access the content is also received by the NAP.

Using the identification of the gateway, the NAP authorization server next identifies the customer. The NAP server identifies the customer (step 215) using customer data in a database accessible to the server. The customer data lookup is based on the gateway data previously received from the gateway. In that way, the NAP relies on the gateway to be a trustworthy entity that is hardened against fraud. Upon receiving the customer data from the database, the NAP authorization server requests (step 220) authorization from the content provider, forwarding to the content provider the customer identification, the content data, and, in the case where authorization will include a device-specific decryption key, the device data.

The NAP server then receives (step 225) an authorization from the content provider server to access the desired content. In a preferred embodiment, that authorization includes a device-specific decryption key created by the content provider based on the device data received from the NAP. That authorization is forwarded (step 230) to the content access device by the NAP server.

One advantage of the method of the present invention is that, because the gateway may be dynamically associated with a user (via a login type mechanism), a user can gain access to authorized content at any physical location where a gateway accessing the NAP can be established. For example, a user may connect to the NAP from a neighbor's house using a neighbor's machine, and subsequently be authorized to access to the content. This then provides to the user of network-authorized content the flexibility to access licensed content wherever network access is available.

An authorization from the content provider may be limited by defined criteria such as the device type on which the user is authorized to play the content, the physical location (associated with gateway location), the total number of accesses, the time of day and the term of the license. For example, the ability of a customer to access the content may be contingent on the access taking place within a license term that expires after a predefined period. Authorization may furthermore be contingent on the physical or logical characteristics of the gateway.

The method of the invention may be used to control access to digital music files, digital video files, ASP (Application Service Provider) based software applications, subscription-based news or sports content, and network games. Several exemplary embodiments are set forth below to illustrate, but not to limit, the invention.

In one embodiment, a user subscribes to a network game service to play an interactive game. Assuming all computers in the household use a single gateway to access the network, the method would allow players to use any computer in the user's household to play the game, and would allow multiple users in the household to play simultaneously. Authorization is provided as described above as each computer starts the game.

In another embodiment, a user purchases a digital music file. Regardless of the device he uses to play it, including a device purchased after the music was purchased, the user can play the music because the NAP will support the authorization of any device associated with the user's account via the gateway.

In another embodiment, a user subscribes to an ASP to access office productivity software. The user can use any computer in his home, including a laptop brought home from work, to run this software because the NAP will support the authorization of any device associated with the user's account via the gateway.

Depending upon the features of the content encryption algorithm, an authorization received from the content provider may be used by more than one device behind the gateway. For example, a movie could be downloaded to an STB and be authorized for playing on any of the STB's in the house if the nature of the encryption algorithm permits it. In that case, the content access devices would have to be engineered to share content decryption keys.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description has been described with particular emphasis on the use of the method in conjunction with the Internet. However, the principles of the present invention could be extended to any large public or private network where authorization to access content must be controlled. Such an extension could be readily implemented by one of ordinary skill in the art given the above disclosure.

What is claimed is:

1. A method for authorizing a customer to access content on a network, the customer being connected through a gateway to an access provider providing access to the network, the method comprising the steps of:
   receiving by a network access provider (NAP) from the customer through the gateway a request for authorization to access content of a content provider;
   identifying the customer using a customer identification database, wherein the customer identification is unique to the customer,
   forwarding the request for authorization and the unique customer identification to the content provider;
   receiving from the content provider authorization for the customer to access the content; and
   forwarding the authorization to the customer enabling the customer to access the content through the gateway.

2. The method of claim 1, wherein the request for authorization from the customer contains data associated with the content.

3. The method of claim 2, wherein the step of forwarding the request for authorization to a content provider includes forwarding the data associated with the content.

4. The method of claim 1, wherein the request for authorization from the customer contains data associated with a device to be used to access the content.

5. The method of claim 4, wherein the step of forwarding the request for authorization to a content provider includes forwarding the data associated with the device.

6. The method of claim 1, wherein the authorization received from the content provider is device-specific.

7. The method of claim 1, wherein the step of identifying the customer further comprises retrieving customer data from a database using data associated with the gateway.

8. The method of claim 1, wherein the content is selected from a group consisting of digital music file, a digital video file, a subscription-based software application, a network game, a digital file and a digital still image.

9. The method of claim 1, wherein the authorization comprises a decryption key.

10. The method or claim 1, wherein the authorization is contingent on at least one criterion selected from the group consisting of a content access device type, the identification of the gateway, a time of day, a license term, gateway characteristics and a gateway physical location.

11. A method for authorizing a customer to access content on a network, the customer being connected through a gateway to an access provider for the network, the method comprising the steps of:
   receiving by a NAP from the customer through the gateway a request for authorization to access content of a content provider, the request including an identification of the gateway and an identification of the device to be used for accessing content;
   retrieving from a database a customer identification database based on the identification of the gateway, wherein the customer identification is unique to the customer, wherein the unique customer identification is communicated through a gateway to a network access provider (NAP) to a content provider;
   forwarding the customer identification and the device identification to a content provider;
   receiving from the content provider a decryption key for decrypting the content; and
   forwarding the decryption key to the customer enabling the customer to access the content through the gateway.

12. The method of claim 11, wherein the gateway between the customer and the network access provider is established using an identifier selected from the group consisting of a password, biometric data, possession of an identity card and possession of a credit card.

13. The method of claim 11, wherein the gateway between the customer and the network access provider is established using the identity of a network connection device.

14. The method of claim 11, wherein the request for authorization from the customer contains data associated with the content.

15. The method of claim 14, wherein the step of forwarding the request for authorization to a content provider includes forwarding the data associated with the content.

16. The method of claim 11, wherein the content is selected from a group consisting of a digital music file, a digital video file, a subscription-based software application, a network game, a digital text file and a digital still image.

17. The method of claim 11, wherein the decryption key permits accessing the content using more than one device.

18. The method of claim 11, wherein the decryption key may be used with only one device.

19. The method of claim 11, wherein the authorization is contingent on at least one criterion selected from the group consisting of a content access device type, the identification of the gateway, a time of day, a license term, gateway physical and logical characteristics and a gateway physical location.

20. A method for authorizing a customer to access content, wherein the customer and a content provider are connected through a network access provider, the method comprising the steps of:
receiving by a NAP from the network access provider an identification of the customer determined by the network access provider using the unique customer identification database through a gateway connecting the customer and the network access provider;
determining that the customer is authorized to access the content based on the identification of the customer, wherein the identification of the customer is unique to the customer;
creating an authorization for the customer to access the content; and
sending the authorization to the network access provider For forwarding to the customer enabling the customer to access the content through the gateway.

21. The method of claim 20, wherein the step of receiving from the network access provider an identification of the customer also comprises receiving data associated with the content.

22. The method or claim 21, wherein the step of determining that the customer is authorized to access the content is also based on the data associated with the content.

23. The method of claim 20, wherein the step of receiving from the network access provider an identification of the customer also comprises receiving data associated with a device to be used to access the content.

24. The method of claim 23 wherein the step of creating an authorization for a customer to access the content includes creating a device-specific decryption key.

25. The method of claim 20, wherein the content is selected from a group consisting of a digital music file, a digital video file, a subscription-based software application, a network game, a digital text file and a digital still image.

26. The method of claim 20, wherein the authorization is contingent on at least one criterion selected from the group consisting of a content access device type, the identification of the gateway, a time of day, a license term, gateway physical and logical characteristics and a gateway physical location.

* * * * *